J. TAKAMINE.
APPARATUS FOR SEPARATING JUICE FROM CITRUS FRUIT.
APPLICATION FILED FEB. 16, 1914.

1,166,867.

Patented Jan. 4, 1916.

WITNESSES:
A. A. Stock
S. Construie.

INVENTOR
Jokichi Takamine
BY
Acres y Toelers
ATTORNEYS

UNITED STATES PATENT OFFICE.

JOKICHI TAKAMINE, OF NEW YORK, N. Y.

APPARATUS FOR SEPARATING JUICE FROM CITRUS FRUIT.

1,166,867.  Specification of Letters Patent.  Patented Jan. 4, 1916.

Application filed February 16, 1914. Serial No. 819,074.

*To all whom it may concern:*

Be it known that I, JOKICHI TAKAMINE, a subject of the Emperor of Japan, residing at New York city, in the county of New York and State of New York, have invented certain new and useful Improvements in Apparatus for Separating Juice from Citrus Fruit, of which the following is a specification.

The present invention is designed for the separating or squeezing of the juice from citrus fruit, but more particularly from oranges for the recovery of the juice for use in connection with industrial enterprises; the object of the invention being the production of a simple, inexpensive, efficient and durable means for removing the juice from the fruit without tearing the membranous wall of the meat cells, so that the fruit meat and juice is thoroughly separated from the rind and the cells inclosed therein free of any portion of torn walls, thus placing the removed meat in condition for the immediate pressing for the extraction therefrom of such of the juice as may be contained within any of the unbroken meat cells. Ordinarily, the practice resorted to for the recovery of the juice for commercial purposes has been to mechanically remove the outer rind from the fruit, and then to pare the pith or inner wall skin from the fruit meat, after which the meat is pressed for the extracting therefrom of the juice. However, such manner of recovering the fruit juice not only seriously impairs the value of the removed rind for commercial use, but tends to impregnate the juice with a proportion of the substance contained in the membranous walls inclosing the fruit meat, which imparts to the extracted juice an unpleasant taste.

To comprehend the invention reference should be had to the accompanying drawings, wherein—

Figure 1:
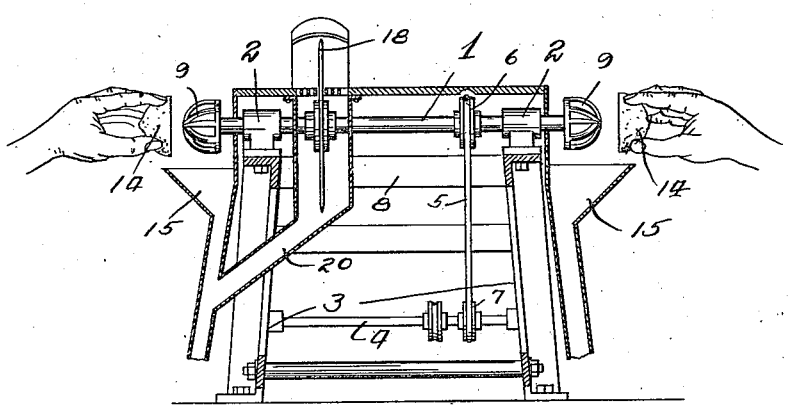
Figure 2:
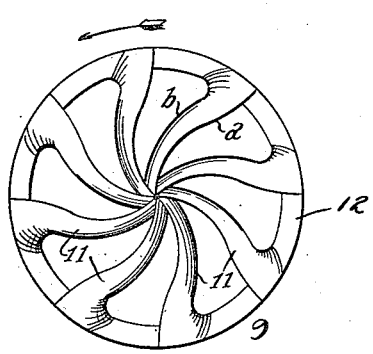
Figure 3:
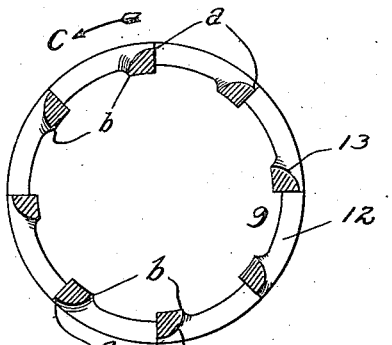
Figure 4:
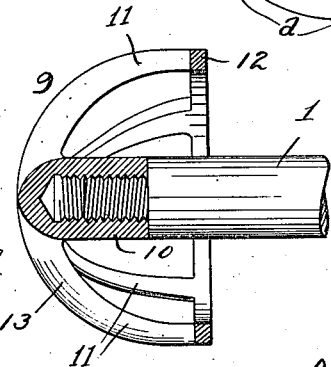

Figure 1 is a view in elevation partly sectioned of the apparatus, illustrating the fruit as about to be applied to the extractor heads. Fig. 2 is a detail view of one of the extractor or presser heads. Fig. 3 is a cross sectional view of one of the extractor heads. Fig. 4 is a longitudinal sectional view of one of the extractor heads.

In the drawings, the numeral 1 is used to designate a rotatable cross shaft mounted in bearings 2 of a suitable supporting frame 3. In the present case, this shaft is driven from a power shaft 4 by means of a power transmitting belt 5, working over the belt pulleys 6 and 7 mounted respectively on the shafts 1 and 4, power being imparted to the drive shaft 4 from an electric motor or other suitable source of power, not shown.

The rotatable shaft 1 is mounted, in the present case, above the frame bed 8, the ends thereof projecting a slight distance beyond the sides of the frame 3, and to each end of the said shaft 1 there is attached a hollow substantially cone-shaped extractor or presser head 9. Each extractor or presser head comprises an interiorly threaded hub 10 for screwing onto the threaded ends of the cross-shaft 1, and a series of rearwardly extended upwardly curved spaced ribs 11 projecting therefrom, each united to a circular supporting base wall or ring 12. Preferably, the hub, ribs and supporting wall or ring of each extractor or presser head are formed integral, but such is a mere constructive feature, for these elements, if so desired, may be formed separate and assembled in any given manner. The ribs 11 may be formed radially, spirally or otherwise, but preference is given to the employment of spiral ribs, as illustrated, and the pressing face 13 of each of said ribs is beveled or inclined downwardly from the upper rear edge *a* thereof to the lower forward edge *b*, so that a smooth surface is presented to the fruit to be acted on.

In the operation of removing the meat and juice the fruit is cut in half transversely so as to cut through each of the meat containing or inclosing cells. High rotative speed being imparted to the extractor or presser heads 9 through the shaft 1 and its drive mechanism, the direction of rotation being indicated by arrow *c*, an operator receives a half section 14 of an orange in each hand and presses the same firmly against the extractor heads 9, which gradually work into the exposed fruit and forcibly removes the meat and juice from within the fruit cells thereof. Inasmuch as the smooth inclined surfaces or faces of the ribs 11 of the extractor bear onto the meat, the same presses therefrom the fruit juice and removes the fruit meat from within the fruit retaining cells without tearing or destroying the membranous walls thereof, which are left within the outer rind of the fruit.

The action of the ribs of the extractor heads 9 is purely a pressing one, the juice and fruit meat as removed from within the rind of the fruit flowing onto the inclined runways 15, for delivery into suitable receptacles situated to receive the same. Inasmuch as the removal from the fruit rind is simply juice and fruit meat, it is only required to recover the juice to pass the same through a suitable strainer and then press the remaining meat to recover therefrom all juice contained therein.

By the use of the above described invention only pure juice and fruit meat is removed from the fruit acted on by the extractor heads and as this is accomplished without tearing or injury to the fruit rind, the said rind may be used for commercial purposes generally.

Owing to the high rotative speed at which the extractor heads are driven, only a second or two is required to thoroughly extract the fruit juice and remove the fruit meat from the cut fruit, consequently a large quantity of fruit may be successfully treated per day and this at a minimum expense.

To expeditiously handle and prepare the fruit for treatment preference is given to the employment of a saw for the cutting or slicing of the fruit in halves, and for this purpose there is mounted within the frame of the machine on the shaft 3 a circular saw blade 16. The fruit to be treated may be presented by the operator of the machine to the action of the saw blade 16 for halving and the severed halves then forced against the extractor heads 9, or one person may attend to the cutting of the fruit and a second operator present the fruit so cut to the extractor heads. However, the saw blade is not essential to the carrying out of the invention, inasmuch as the fruit may be cut in any suitable manner and delivered mechanically or otherwise to the operator of the machine. Still, to provide against possible loss of the fruit juice which escapes during the operation of cutting or halving the fruit, preference is given to the employment of a saw blade mounted within the frame of the machine, so that the fruit may be presented at the earliest possible moment to the action of the extractor heads. Such juice as escapes during the cutting operation of the saw blade flows into an inclined chute or runway 20 situated within the frame to receive the same and deliver the fruit juice to the receptacle for receiving the juice from the runways 15.

While I have described and illustrated the preferred embodiment of a successful and operative machine for the described purpose, still, the invention is not limited to the specific details of working elements so shown and described, inasmuch as the essence of the invention resides in the utilization of one or more rotary extractor heads, so constructed as to act against the interior of a cut orange or other fruit as to forcibly press the juice and fruit meat therefrom without tearing and removing the membranous cell walls, and without destroying the inclosing rind for the fruit meat.

Having thus described the invention what is claimed as new and desired to be protected by Letters Patent is:—

1. In an apparatus for the purpose described, comprising an extractor head, said head composed of a ring member and a series of longitudinally curved blades connected to the ring and extending therefrom, the said blades being connected to each other at their outer ends.

2. The combination in an apparatus for the described purpose, of a fruit extractor comprising a substantially cone-shaped head formed of a series of united circumferentially disposed upwardly extended curved spiral ribs, spaced one from the other, and the bearing face of each being gradually curved from its lower front edge to its upper rear edge.

3. In an apparatus for the purpose described comprising an extractor head, said head composed of a ring member, and a series of longitudinally curved blades connected to the ring and extending therefrom, said blades being connected at their other end and having rounded fruit engaging surfaces.

4. In an apparatus for the purpose described comprising an extractor head composed of a hollow annular ring member, series of blades leading from said ring and the terminals of said blades remote from said ring being connected, the said blades having rounded fruit engaging surfaces.

5. In an apparatus for the purpose described comprising an extractor head composed of an annular ring, a series of blades connected to the ring and extending therefrom to present a substantially cone shaped surface, said blades being curved longitudinally and substantially triangular in cross section to present rounded fruit engaging surfaces.

6. In a device of the kind described comprising an extractor head composed of an annular ring member having a series of blades projecting therefrom, said blades having rounded fruit engaging surfaces to prevent the tearing of the fruit, and a connecting means for the free ends of the said blades.

In testimony whereof I have signed my name to this specification in the presence of two subscribing witnesses.

JOKICHI TAKAMINE.

Witnesses:
K. V. DUNHAM,
KEIZO WOOYENAKA.